(12) United States Patent
Tengler et al.

(10) Patent No.: US 7,742,603 B2
(45) Date of Patent: Jun. 22, 2010

(54) SECURITY FOR ANONYMOUS VEHICULAR BROADCAST MESSAGES

(75) Inventors: Steve Tengler, Grosse Pointe Park, MI (US); Scott Andrews, Los Altos, CA (US); Ronald Heft, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 983 days.

(21) Appl. No.: 11/389,859

(22) Filed: Mar. 27, 2006

(65) Prior Publication Data

US 2007/0222555 A1 Sep. 27, 2007

(51) Int. Cl.
*H04M 1/66* (2006.01)
*G05B 19/00* (2006.01)

(52) U.S. Cl. .................... 380/270; 380/43; 380/45; 380/264; 380/277

(58) Field of Classification Search ............... 380/200, 380/30; 709/12, 14; 713/192, 168, 182; 726/4, 13, 30, 24
See application file for complete search history.

(56) References Cited

U.S. PATENT DOCUMENTS

| 6,819,245 | B1* | 11/2004 | Dilling ..................... 340/572.1 |
| 7,486,795 | B2 | 2/2009 | Eschenauer et al. |
| 2004/0003234 | A1 | 1/2004 | Reinold et al. |
| 2005/0147245 | A1 | 7/2005 | Hassan et al. |
| 2006/0039341 | A1 | 2/2006 | Ptasinski et al. |
| 2006/0173694 | A1* | 8/2006 | Itabashi ......................... 705/1 |
| 2007/0200671 | A1 | 8/2007 | Kelley et al. |
| 2007/0206796 | A1* | 9/2007 | Iino et al. .................... 380/270 |
| 2007/0264973 | A1* | 11/2007 | Dowek et al. ............... 455/411 |
| 2008/0095374 | A1* | 4/2008 | Schreyer ..................... 380/282 |
| 2008/0232382 | A1* | 9/2008 | Iwama et al. ................ 370/401 |

* cited by examiner

*Primary Examiner*—Kieu Oanh Bui
*Assistant Examiner*—Nega Woldemariam
(74) *Attorney, Agent, or Firm*—Global IP Counselors, LLP

(57) ABSTRACT

An anonymous vehicular broadcast system that has encrypted links between the roadway infrastructure and the vehicles. The vehicles each have a common private key that is generated from a certification key, provided by a certification authority, and a configuration key that is generated at each power up of the vehicle. The configuration key is not stored in the vehicle so that the vehicle is only stores a portion of the private key.

25 Claims, 6 Drawing Sheets

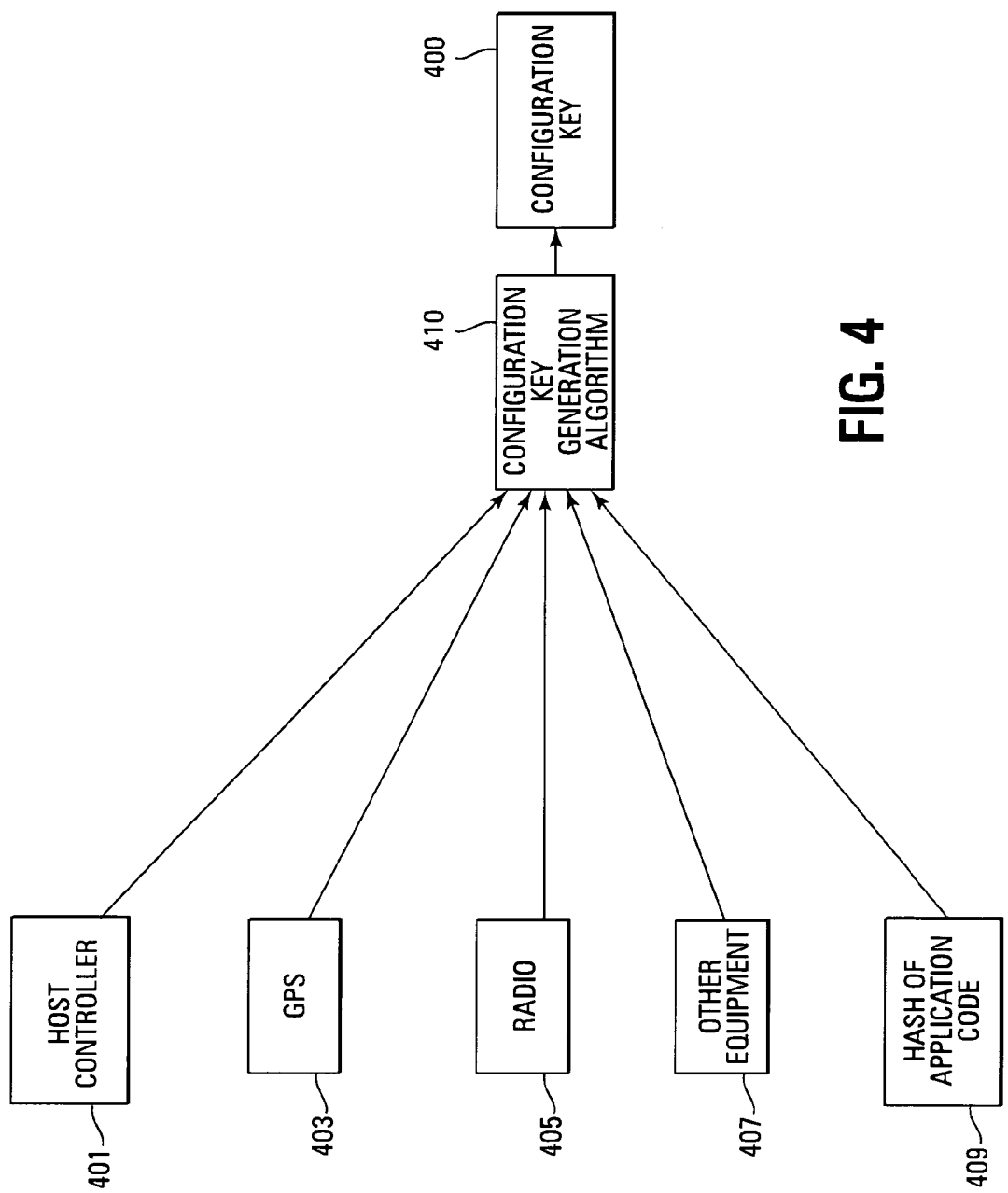

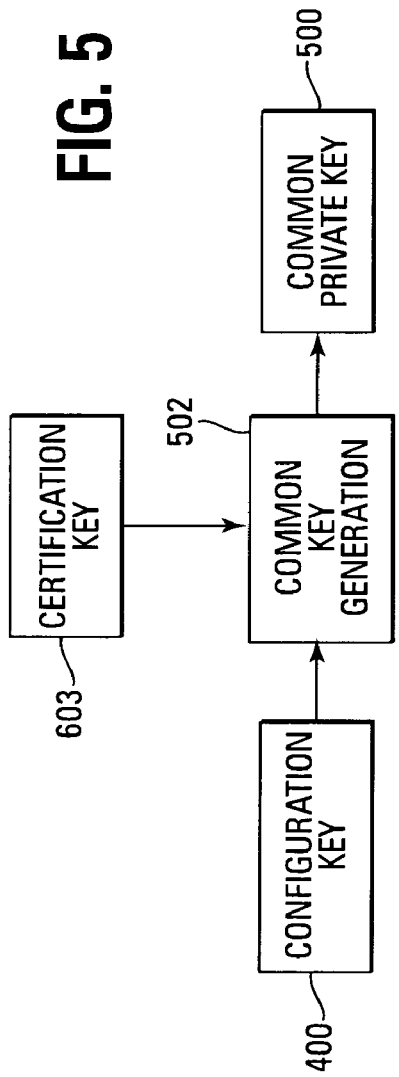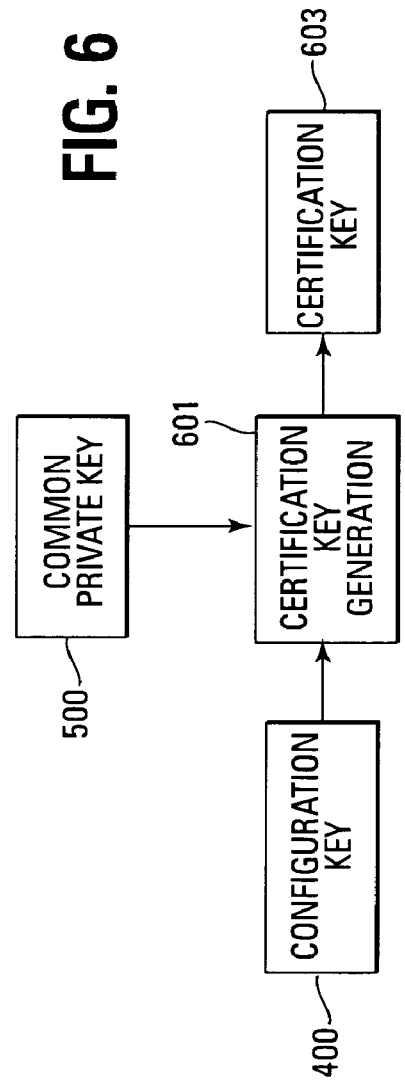

SECURITY FOR ANONYMOUS VEHICULAR BROADCAST MESSAGES

BACKGROUND OF THE INVENTION

A vehicle-to-vehicle and vehicle-to-infrastructure wireless communication system creates a large number of potential uses that include crash avoidance, communications, law enforcement, and entertainment. One such system is the Dedicated Short Range Communications (DSRC). This system can include a common message set, broadcast by each vehicle, that is comprised of relevant kinematical and location information including GPS/vehicle position, velocity, vehicular dimensions, as well as other relevant vehicle information.

For a typical crash avoidance system, a vehicle would analyze any received information, determine if a crash was imminent, send a confirmation message to the other vehicle, and exchange information with vehicle sub-systems to mitigate vehicle/occupant damage/injury before crashing. For example, once the accident seems likely, the vehicle sub-systems such as airbags and seatbelts can be instructed to prepare for a crash.

SUMMARY

The present invention encompasses a vehicle communication system for anonymous transmission of encrypted data. The method provides anonymous broadcast message security between a wireless terminal and a base station. In one embodiment, the terminal is located in a vehicle and the base station is a roadway infrastructure base station. The method comprises storing only a first portion of a common private key in the terminal. The common private key is made up of at least two portions. The remaining portion of the common private key is not stored in the terminal. The remaining portion is generated at power-up of the terminal in response to a configuration of the terminal. In the embodiment where the terminal is in a vehicle, the configuration of the vehicle is used to generate the remaining portion of the common private key.

Further embodiments of the invention include methods and apparatus of varying scope.

BRIEF DESCRIPTION OF THE DRAWINGS

FIG. 4 shows a flowchart of one embodiment of a method for generating a vehicle configuration key of the present invention.

FIG. 5 shows a flowchart of one embodiment of a method for generating a common private key of the present invention.

FIG. 6 shows a flowchart of one embodiment of a method for generating a certification key of the present invention.

DETAILED DESCRIPTION

Figure 1:
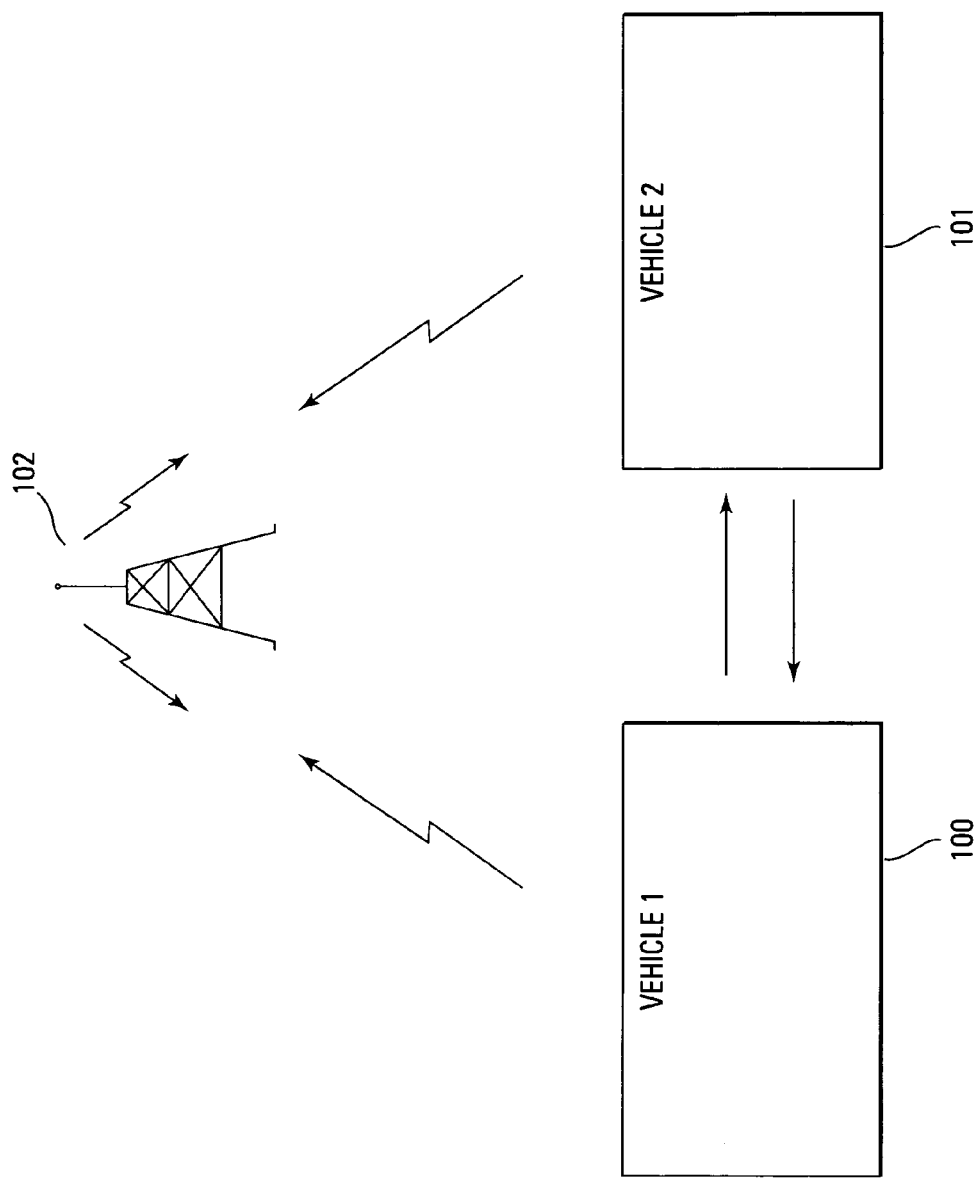
FIG. 1 shows a diagram of one embodiment of a wireless, short range, vehicular communication system.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

FIG. 1 illustrates a diagram of one embodiment of a wireless, short range, vehicular communication system of the present invention. The system is comprised of one or more vehicles 100, 101 and the fixed roadway infrastructure 102.

The vehicles 100, 101 are each capable of transmitting and receiving data messages. The data messages may be comprised of vehicle velocity and vehicle location as well as other necessary information. As described subsequently, the data messages are sent in an encrypted format to prevent monitoring of the information and/or to protect the user/infrastructure from attacks from hackers.

The vehicles 100, 101 are also in communication with the roadway infrastructure 102. The infrastructure 102 is comprised of a large quantity of low power transmitters/receivers to communicate wirelessly with the vehicles 100, 101 as they travel along roads.

Figure 2:
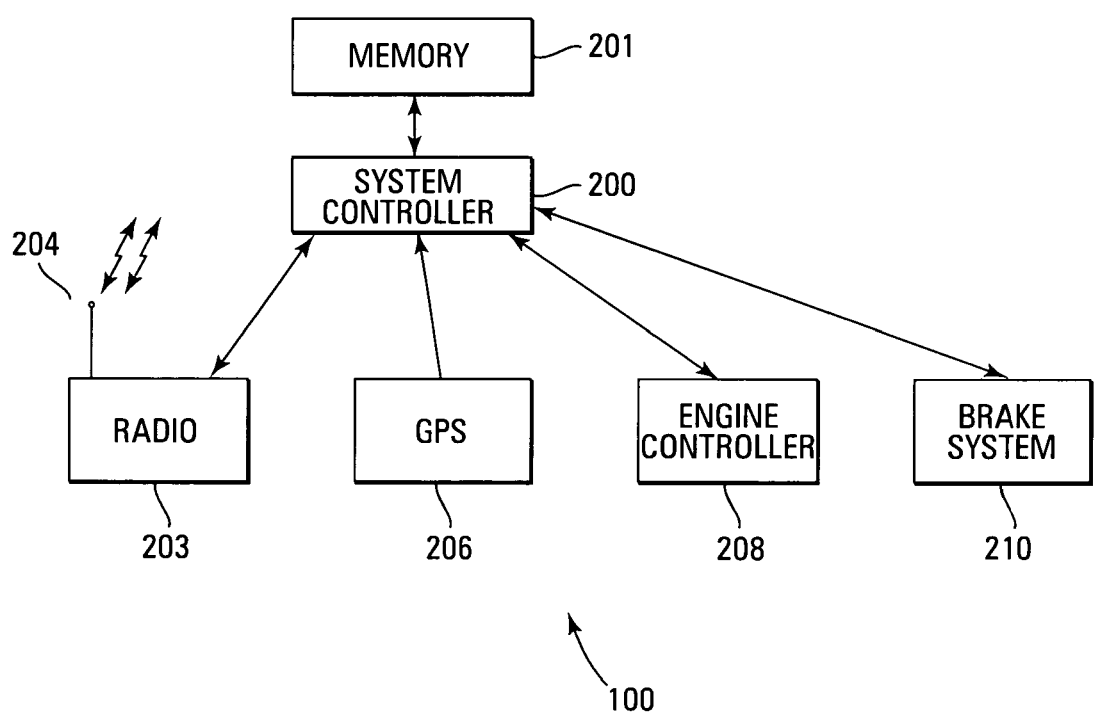
FIG. 2 shows a block diagram of one embodiment of the vehicular system in accordance with the embodiment of FIG. 1.

FIG. 2 illustrates a block diagram of one embodiment of a vehicle of the present invention. The vehicular system is comprised of a system controller 200 that performs any required control of the system including reading electronic serial numbers of system components, generating any required encrypted messages for transmission, and decrypting messages received from other vehicles or roadway infrastructure. The system controller 200 can be a microprocessor, microcontroller, a state machine, or some other type of controlling circuitry.

The system controller 200 is coupled to system memory 201. The memory block 201 of FIG. 2 can include RAM, ROM, flash memory, optical storage drives, magnetic storage drives, or other types of memory devices. The memory 201 can store information temporarily while the system controller 200 is working on the data, such as during a decryption of a received message. The memory can also permanently store data such as private keys used to decrypt/encrypt messages.

The vehicular system is further comprised of the system components such as the relatively low power radio 203 and antenna 204 that are used to communicate with other vehicles or the roadway infrastructure. In one embodiment, this transceiver 203 communicates within a range measured in tens of feet since higher power systems might cause conflicts with other data traffic in other parts of the system.

A global positioning satellite (GPS) receiver 206 is used to determine the vehicles position in relation to three or more GPS satellites. This position information can then be transmitted to the system controller 200 for storage or use in generating data messages for transmission. The present invention is not limited to just GPS navigation. Alternate embodiments can use alternate satellite navigation systems, an internal vehicular inertial navigation system, or some type of ground-based navigation system.

An engine controller 208 is used to control operation of the engine. The engine controller 208 may be responsible for controlling engine timing/performance in response to received parameters such as throttle position, exhaust gas composition, stored performance data in memory, or other types of parameters.

The brake system 210 is comprised of the hardware/software necessary to control operation of the vehicle brakes. This system 210 can include anti-lock brakes and traction control.

The system of FIG. 2, in one embodiment, could also include a module that provides variable input to a DSRC-enabled safety system. For example, a module that helps improve the stability of some vehicles and provide the "CAN BUS" with "deceleration information". As is well known in the art, this is used for one of the DSRC applications (i.e., "Emergency Electronic Brake Light"—an application that warns other drivers when deceleration exceeds a certain threshold). If someone swapped out this module to create a bogus output, it could create accident(s) by warning other vehicles about a contrived event.

The modules of FIG. 2 are for purposes of illustration only. Alternate embodiments can use various other configurations depending on the application.

The above-described vehicular components can all be identified by the system controller 200 by an electronic serial number (ESN), or other identification, assigned to each particular system block 203, 206, 208, 210. The ESN is a unique identification, not necessary numeric, that is assigned by the component manufacturer and stored in the component in order to uniquely identify that component to a system capable of reading such an identification. These ESN identifiers are used, as described subsequently, in generating the desired encryption keys of the present invention.

Figure 3:
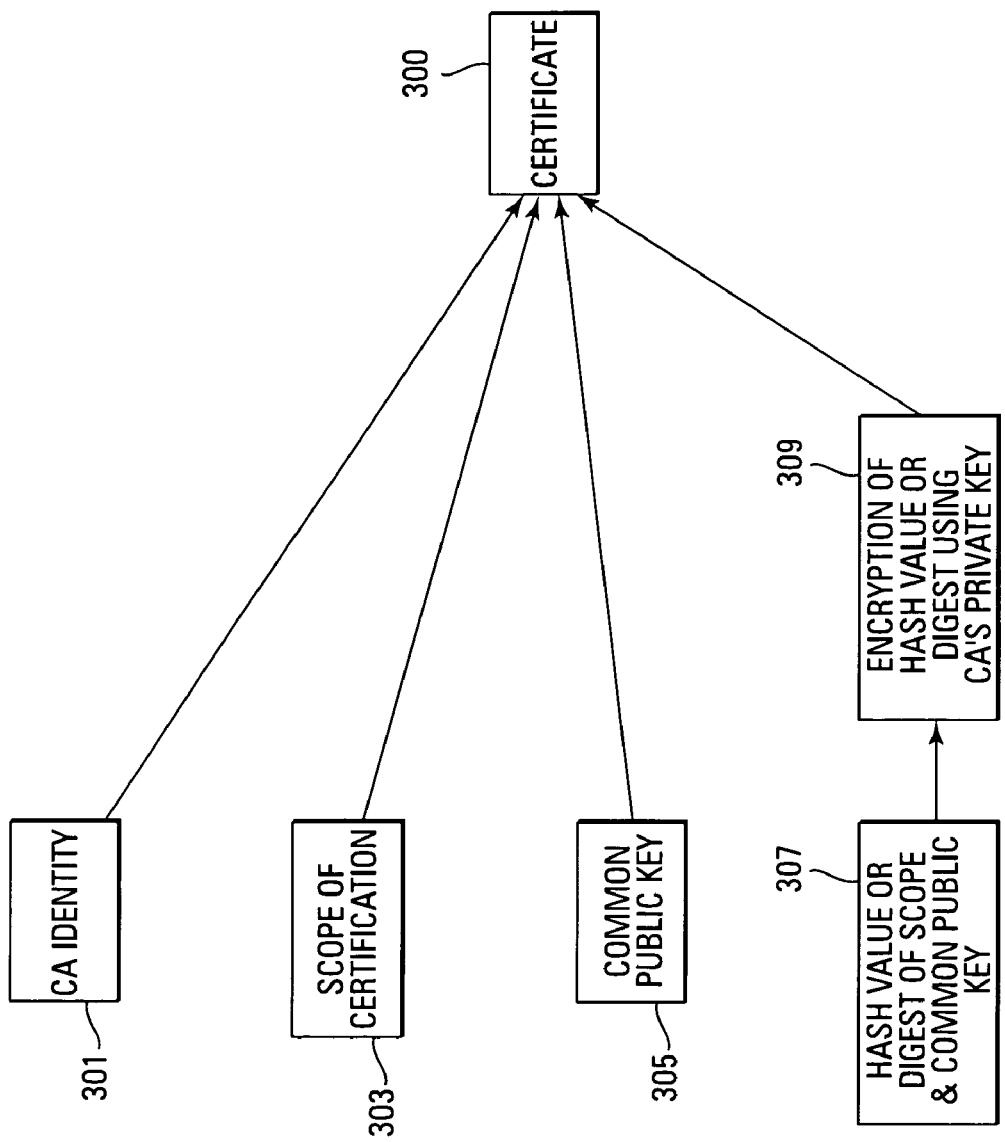
FIG. 3 shows a flowchart of one embodiment of a method for generating a certificate of the present invention.

FIG. 3 illustrates a flowchart of one embodiment for generating a certificate of the present invention. The certificate is used to convey the public key that can be used to authenticate messages signed by the vehicle from which they originate. The certificate is not unique to any one vehicle, it is shared with a number of different vehicles.

The certificate is generated by the certification authority (CA) from multiple components. One component is an identification of the certification authority 301. The certification authority is the entity or organization that is responsible for generating, distributing, and revoking certificates. The identification of the CA 301 may be the CA name, a CA number, or some other unique identifier 301.

The scope of the certification 303 is data that indicates what the certificate "certifies". In other words, the certificate's scope 303 indicates what the vehicular system is authorized to provide.

The vehicle public key 305 is also part of the certificate 300. The public key 305 is a decryption key that is issued to a plurality of public vehicles and is used to decrypt or authenticate encrypted or signed data sent to the vehicle.

The certificate signature 307 is a hash value of the other certificate components 301, 303, 305 that is encrypted using the certificate authority's private key. As is well known in the art, in public/private key cryptography, the private key is generally kept secret, while the public key may be widely distributed. One key "locks" the information while the other is required to "unlock" it. It should not be possible to deduce the private key of a pair of keys given the public key.

Also as is well known in the art, a hash value is a fixed length, electronic identifier that is generated from an encryption routine (i.e., hash function) in response to an algorithm. Two different inputs are unlikely to hash to the same hash value. Hash values are used in computing as a way to verify whether a piece of information, like a computer program or data, has been altered.

The validity of the certificate 300 can be determined by the vehicle by performing a decryption with the signature from the certificate and the certificate authority's public key. The result is then compared with the hash value from the hash algorithm 309. If they match, the certificate 309 is valid.

The certificate provides each of these vehicles with the public key that corresponds to the private key used by the vehicle sending the message. The vehicle's private key thus provides the vehicle with the ability to sign messages that will work with that particular certificate.

If the certificate is valid, it contains the valid public key for the vehicle and can be used to perform a similar validation on a received message from a vehicle or the infrastructure. The public key is used to decode, and thereby validate the message signature.

The certificate is shared by a large number of other vehicles to provide anonymity for the sending vehicle, and it provides a validatable key that can be used to authenticate a message signed by the vehicle's private key. In this way, the infrastructure system cannot immediately determine who sent the message, only that it was a valid message from a legitimate vehicle.

The vehicle's private key is generated in such a way as to attest to the validity of the vehicle configuration, and to conform to the public key contained in the certificate. In this way, the use of a private key that corresponds to the public key in the certificate attests to the validity of the vehicle terminal.

In order to attest to the legitimacy of the vehicle system configuration, the vehicle's private key is derived from an observed and certified configuration of the vehicle components. This is accomplished by generating the private key from two components: the Configuration key and the Certification key. The certification key is derived from the specifically observed and certified configuration of the vehicle system components; for example by obtaining performing an algorithm on the electronic serial numbers of the various system components. The certification key is derived by the Certificate Authority in such a way that an algorithm performed on both the certification key and the configuration key generates the private key that is contained in the certificate described above.

FIG. 4 illustrates a flowchart of one embodiment of the present invention for generating a configuration key of a particular vehicle.

As described previously with reference to FIG. 2, each vehicle component is identified by a unique identifier, such as an ESN. The host system controller 401, the navigation system 403, the radio 405, and other installed equipment 407 all include some type of identification that can be read by the system controller. Additionally, the application code that is stored in the vehicle system, in one embodiment, can also include a hash value 409 generated in response to the code.

The identifiers are read by a configuration key generation algorithm 410. The algorithm 410 uses this information to generate a configuration key 400 that is unique to that particular configuration of components in the vehicle. If the vehicle configuration is ever changed, such as changing one of the components or changing the binary code running the system, the configuration key 400 will also change. To this end, the configuration key 400 is erased after being used during the certification process described subsequently. This key 400 is not stored in the vehicle but is generated anew each time the vehicle is started. This provides verification that the vehicle configuration has not been altered after completion of the certification process since a component that has been exchanged with one having a different identifier will produce a different configuration key 400. As will be seen subsequently, if the configuration key is altered after the certification process, the vehicle will not be able to sign messages that can be authenticated using the public key contained in the certificate, because the private key generated from the derived configuration key and the stored certification key will not correspond to the public key in the certificate.

The certification process of the present invention is performed by the certification authority and involves generating a common private key and using that key in conjunction with the configuration key to generate a certification key. The fact that the certification key algorithmically combined with the configuration key produces a private key that corresponds to or encodes data that can be decoded by, the public key in the certificate provides certification that the vehicle configuration is the same as it was when the certification key was created, and this the vehicle represents a legitimate system.

FIG. 5 illustrates a flowchart of one embodiment for generating the common private key of the present invention. The common private key 500 is comprised of the certification key 603 that is generated by the certification authority, and the configuration key 400 as described previously. These two keys 400, 603 are operated on by a common key generation algorithm 502 to generate the common private key 500 that corresponds to the public key contained in the certificate that is stored in the car. The common private key 500 is not stored in the vehicle, but is derived in the vehicle from the stored certification key and the computed configuration key.

FIG. 6 illustrates a flowchart of one embodiment for generating the certification key 603 of the present invention. The certification key 603 is stored in the vehicle. In one embodiment, the certification key is stored in an encrypted form. The encrypted certification key is decrypted before use by using a separate key that is stored in the vehicle.

The certification key 603 is comprised of the vehicle's configuration key 400 and the common private key 500. These keys are operated on by a certification key generation algorithm 601 to generate the certification key 603.

Alternate embodiments of the present invention can use multiple certification keys that, when combined with one or more algorithmically derived configuration keys result in a plurality of private keys corresponding to a plurality of public keys contained in a plurality of certificates to make compromising the keys more difficult for hackers or other unauthorized people desiring to access the system. For example, one system might have 1000 certification keys with 1000 sets of associated public keys.

Figure 7:
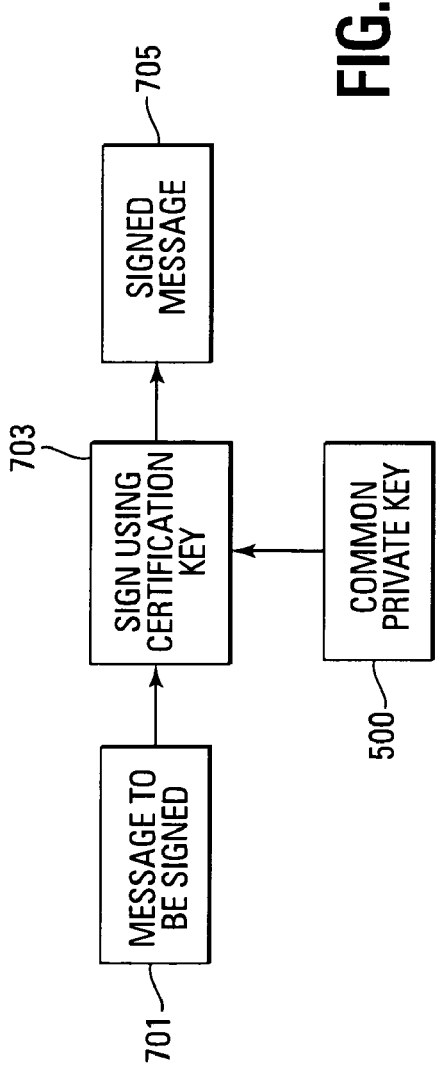
FIG. 7 shows a flowchart of one embodiment of a method for signing a message of the present invention.

FIG. 7 illustrates a flowchart of one embodiment of a method for signing a message for transmission in the system of the present invention. This method can be used by the vehicle in generating a message for transmission to another vehicle or the roadway infrastructure that can be validated by the above described known processes for message signing.

The method is comprised of generating the message to be signed 701. If the message is coming from a vehicle, the message may be the vehicle's velocity, location, status, or some other vehicle message.

The message 701 is combined 703 with the common private key 500. Since the common private key is used by many vehicles, the signed message 705 is unrelated to the vehicle sending the message, yet it can only have been signed by a vehicle with a configuration of components that is the same as the configuration that was observed and certified when the vehicle's certification key was generated by the certification authority.

In one embodiment, only a portion of the message is encrypted. This results in faster encryption/decryption than having to encrypt/decrypt the entire message.

Figure 8:
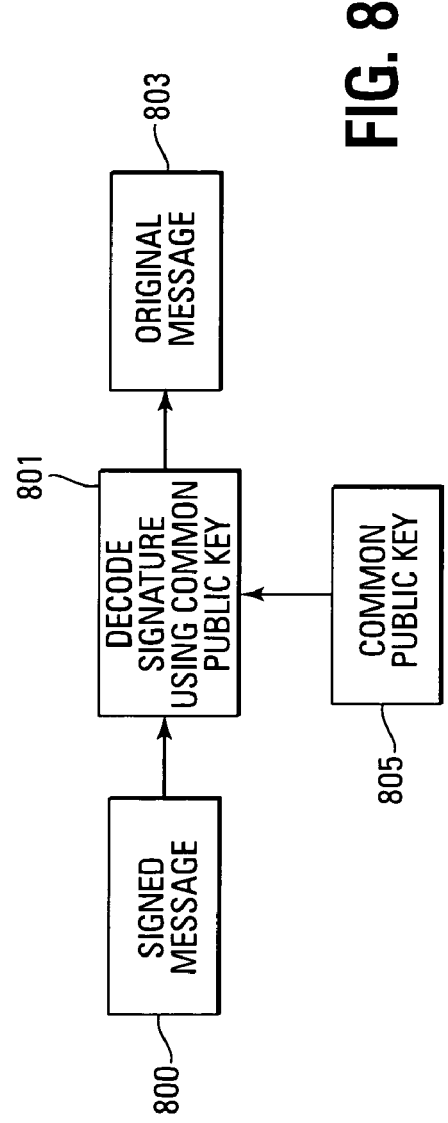
FIG. 8 shows a flowchart of one embodiment of a method for message authentication of the present invention.

FIG. 8 illustrates a flowchart of one embodiment of a method for authenticating a received message. The received message 800 is decoded 801 using the common public key 805. The result is the original message 803 that was transmitted by either the infrastructure or a vehicle.

In one embodiment, the embodiments for the method for anonymously securing wireless broadcast messages is performed in a dedicated short range communications (DSRC) system. Such a system could involve automobiles as the vehicles. However, the present invention is not limited to transportation. Other systems requiring such anonymous security can also use the present invention. For example, between a wireless terminal and a base station, or between any system wherein the specific configuration of components is relevant to the authenticity of the signed or encrypted message.

In summary, the embodiments of the present invention provide a means for asymmetric message encryption without storing a private key in the vehicle. The private key is generated from two pieces of information: the identifying configuration of the vehicle and only an algorithmically related portion of the private key (i.e., the certification key) that was provided to the vehicle during certification. The vehicle is required to generate the configuration as the remaining algorithmically related portion of the private key every time the vehicle is started since neither the entire private key nor the configuration key is stored in the vehicle.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method for providing anonymous broadcast message security between a first wireless terminal of a vehicle and a second wireless terminal based on a public-key cryptography using a private key for encrypting a data message and a public key for decrypting the data message, the method comprising:

receiving a certificate by the first wireless terminal, the certificate including a first portion of the private key and the public key, wherein the public key is shared by a plurality of wireless terminals including at least the first wireless terminal and the second wireless terminal;

storing only a first portion of the private key in the first wireless terminal, with the private key having two portions;

generating the remaining portion of the private key in the first wireless terminal based on a configuration of a plurality of vehicle components of the vehicle, such that the remaining portion is not stored in the first wireless terminal and the remaining portion changes when the configuration of the vehicle components of the vehicle changes, with the first portion and the remaining portion being different from each other;

generating the data message at the first wireless terminal;

signing at least a portion of the data message with the private key to generate a signed message;

transmitting the signed message to the second wireless terminal; and authenticating the signed message at the second wireless terminal by decrypting the signed message using the public key.

2. The method of claim 1 wherein
the first wireless terminal is a radio in the vehicle and the second wireless terminal is a roadway infrastructure base station radio.

3. The method of claim 2 wherein
each of the vehicle components of the vehicle includes an identification, and
the remaining portion of the private key includes a configuration key generated based on a combination of the plurality of identifications.

4. The method of claim 3 wherein
the configuration key further generated based on a hash value of application code related to operation of the vehicle.

5. The method of claim 1 wherein
the first wireless terminal is a radio in the vehicle and the second wireless terminal is a radio in a second vehicle.

6. The method of claim 1 wherein
the certificate is generated by performing a hash algorithm on a certified scope of the first wireless terminal and the public key.

7. The method of claim 1 further including
the generating of the remaining portion of the private key further includes generating the remaining portion of the private key at each power-up of the first wireless terminal.

8. A method for providing anonymous broadcast message security between a vehicle and a roadway infrastructure that is coupled to a certification authority based on a public-key cryptography using an original common private key for encrypting a message and a common public key for decrypting the message, the vehicle including a plurality of components each having an identification, the method comprising:
the certification authority transmitting a certificate to the vehicle, the certificate having the common public key, and the common public key is shared by a plurality of vehicles including the vehicle and a second vehicle;
storing the certificate in the vehicle;
generating a configuration key as one portion of the original common private key in the vehicle based on the identifications of the plurality of components of the vehicle such that the configuration key is not stored in the vehicle and the configuration key changes when a configuration of the plurality of components of the vehicle changes;
generating an original certification key as another portion of the original common private key in response to a common private key and the configuration key, with the configuration key and the original certification key being different from each other;
storing the original certification key in the vehicle;
generating the original common private key in response to the configuration key and the original certification key;
signing at least a portion of the message with the original common private key to generate a signed message;
transmitting the signed message from the vehicle to the second vehicle; and
authenticating the message at the second vehicle by decrypting the signed message using the common public key.

9. The method of claim 8 wherein
the original common private key is generated through an algorithm using the certification key and the configuration key as inputs.

10. The method of claim 9 wherein
the algorithm used to generate the original common private key is stored in an encrypted form and is decrypted before use by using a separate key stored in the vehicle.

11. The method of claim 8 wherein
the stored certification key is stored in an encrypted form and is decrypted before use by using a separate key stored in the vehicle.

12. The method of claim 8 wherein
the generating of the configuration key further includes generating the configuration key at power up of the vehicle.

13. The method of claim 8 wherein
the identification of each of the plurality of components has a unique electronic serial number, and
the generating of the configuration key includes combining the electronic serial numbers using an algorithm.

14. The method of claim 8 further comprising:
the vehicle transmitting an encrypted configuration key to the roadway infrastructure, the encryption being performed in response to the original certification key;
transmitting the configuration key to the certification authority;
the certification authority comparing the received configuration key to a stored configuration key stored at the certification authority;
if the received configuration key is the same as the stored configuration key, transmitting the certificate, containing the common public key, and an encrypted certification key to the vehicle;
the vehicle decrypting the encrypted certification key; and
the vehicle replacing the original certification key with the decrypted certification key.

15. A method for providing anonymous broadcast message security between a vehicle and roadway infrastructure that is coupled to a certification authority based on a public-key cryptography using an original common private key for encrypting a message and a common public key for decrypting the message, the vehicle including a plurality of components each having an identification, the method comprising:
the certification authority transmitting a certificate to the vehicle, the certificate having the common public key, and the common public key being shared by a plurality of vehicles including the vehicle and a second vehicle;
storing the certificate in the vehicle;
generating a configuration key as one portion of the original common private key in the vehicle in response to the plurality of components such that the configuration key is not stored in the vehicle;
generating an original certification key as another portion of the original common private key in response to a common private key and the configuration key;
storing the original certification key in the vehicle;
transmitting the signed message from the vehicle to the second vehicle; and
authenticating the message at the second vehicle by decrypting the signed message using the common public key.

16. A method for providing anonymous broadcast message security between a vehicle and roadway infrastructure that is coupled to a certification authority based on a public-key cryptography using an original common private key for encrypting a message and a common public key for decrypting the message, the vehicle including a plurality of components each having an identification, the method comprising:
the certification authority transmitting a certificate to the vehicle, the certificate having the common public key, and the common public key being shared by a plurality of vehicles including the vehicle and a second vehicle;

storing the certificate in the vehicle;

generating a configuration key as one portion of the original common private key in the vehicle in response to the plurality of components such that the configuration key is not stored in the vehicle;

generating an original certification key as another portion of the original common private key in response to a common private key and the configuration key;

storing the original certification key in the vehicle;

signing at least a fragment of the message with the original common private key, an effect of signing the message with the original common private key being effected by signing first with the certification key and then with the configuration key;

transmitting the signed message from the vehicle to the second vehicle; and authenticating the message at the second vehicle by decrypting the signed message using the common public key.

17. A method for communicating over an anonymous broadcast message security link between a first vehicle and a roadway infrastructure base station based on a public-key cryptography using a common private key for encrypting a data message and a public key for decrypting the data message, the method comprising:

the infrastructure base station transmitting the public key to a plurality of vehicles including the first vehicle and a second vehicle;

storing only a first portion of the common private key in the first vehicle, with the common private key having two portions;

generating the remaining portion of the common private key in the first vehicle based on a configuration of a plurality of vehicle components of the first vehicle in response to a power-up of the first vehicle, such that the remaining portion is not stored in the first vehicle and the remaining portion changes when the configuration of the vehicle components of the first vehicle changes, with the first portion and the remaining portion being different from each other;

generating the data message;

signing the data message with the common private key to generate a signed data message; and transmitting the signed data message to the second vehicle; and authenticating the message at the second vehicle by decrypting the signed message using the public key.

18. The method of claim 17 further comprising communicating between the first vehicle and a second vehicle such that at least a fragment of each message being transmitted is encrypted with the common private key.

19. The method of claim 17 wherein only a fragment of the signed data message is encrypted with the common private key.

20. The method of claim 17 wherein the data message includes information regarding at least one of a plurality of vehicle operating parameters.

21. The method of claim 17 wherein the vehicle components of the first vehicle include a host controller, a GPS, a radio, and an application code, each component having a unique identifier.

22. A vehicular communication system based on a public-key cryptograph using a common private key for encrypting a data message and a public key for decrypting the data message, the system comprising:

a roadway base station coupled to a certification authority configured to generate a certificate that includes a first portion of the common private key and the public key, the public key being shared by a plurality of vehicles; and a vehicle including:

a plurality of components each having a unique identifier, the plurality of components including a transceiver for communicating with the roadway base station and a second vehicle;

a memory that stores a first portion of the common private key; and a controller coupled to the memory and the plurality of components and adapted to:

generate a configuration key based on the unique identifiers of the components such that the configuration key changes when a configuration of the vehicle components changes and the first portion of the common private key and the configuration key are different from each other, generate the common private key in response to the first portion from memory and the configuration key, erase the configuration key after generation of the entire common private key generate the data message;

encrypt the data message using the common private key; and send the encrypted data message to the second vehicle, such that the second vehicle can authenticate the message by decrypting the message using the public key.

23. The system of claim 22 wherein the unique identifiers are electronic serial numbers.

24. The system of claim 22 wherein the controller is further adapted to generate the data message for transmission to the roadway base station.

25. The method of claim 8 further comprising authenticating the vehicle prior to the transmitting of the certificate from the certification authority to the vehicle, the authenticating of the vehicle including the vehicle transmitting a configuration key to the roadway infrastructure, transmitting the configuration key to the certification authority, and the certification authority comparing the received configuration key to a stored configuration key stored at the certification authority.

* * * * *